United States Patent
Zhang et al.

(10) Patent No.: US 11,951,680 B2
(45) Date of Patent: Apr. 9, 2024

(54) SUNKEN 3D PRINTER AND 3D PRINTING METHOD

(71) Applicant: AIDITE (QINHUANGDAO) TECHNOLOGY CO., LTD., Qinhuangdao (CN)

(72) Inventors: Jiaxin Zhang, Qinhuangdao (CN); Youdao Xing, Qinhuangdao (CN); Zhen Wang, Qinhuangdao (CN); Baisong Li, Qinhuangdao (CN)

(73) Assignee: Aidite (Qinhuangdao) Technology Co., Ltd., Qinhuangdao (CN)

( * ) Notice: Subject to any disclaimer, the term of this patent is extended or adjusted under 35 U.S.C. 154(b) by 18 days.

(21) Appl. No.: 17/941,214

(22) Filed: Sep. 9, 2022

(65) Prior Publication Data

US 2023/0133696 A1 May 4, 2023

(30) Foreign Application Priority Data

Nov. 2, 2021 (CN) .......................... 202111287934.4

(51) Int. Cl.
| | |
|---|---|
| *B29C 64/124* | (2017.01) |
| *B29C 64/214* | (2017.01) |
| *B29C 64/232* | (2017.01) |
| *B29C 64/245* | (2017.01) |
| *B29C 64/25* | (2017.01) |
| *B29C 64/255* | (2017.01) |
| *B29C 64/264* | (2017.01) |
| *B33Y 10/00* | (2015.01) |
| *B33Y 30/00* | (2015.01) |

(52) U.S. Cl.
CPC .......... *B29C 64/124* (2017.08); *B29C 64/214* (2017.08); *B29C 64/232* (2017.08); *B29C 64/245* (2017.08); *B29C 64/25* (2017.08); *B29C 64/255* (2017.08); *B29C 64/264* (2017.08); *B33Y 10/00* (2014.12); *B33Y 30/00* (2014.12)

(58) Field of Classification Search
CPC ... B29C 64/124; B29C 64/129; B29C 64/135; B29C 64/214; B29C 64/215; B33Y 10/00; B33Y 30/00
See application file for complete search history.

(56) References Cited

FOREIGN PATENT DOCUMENTS

| CN | 111453141 A | * | 7/2020 |
|---|---|---|---|
| CN | 111572020 A | * | 8/2020 |
| CN | 111805895 A | * | 10/2020 |

* cited by examiner

*Primary Examiner* — Thu Khanh T. Nguyen
*Assistant Examiner* — Jamel M Nelson
(74) *Attorney, Agent, or Firm* — Dykema Gossett PLLC (57) ABSTRACT

The present disclosure belongs to the technical field of 3D printers, and a sunken 3D printer and a 3D printing method are disclosed. The sunken 3D printer comprises a main platform, a first linear driving mechanism, a second linear driving mechanism, a printing platform and an optical machine scraper assembly. The main platform comprises a horizontal platform and a vertical platform which are perpendicular to each other, and a resin tank is provided in the horizontal platform; and the first linear driving mechanism and the second linear driving mechanism are installed at the two ends of the vertical platform, the first linear driving mechanism is used for driving the printing platform to move up and down, and the second linear driving mechanism is used for driving the optical machine scraper assembly to move up and down.

20 Claims, 2 Drawing Sheets

SUNKEN 3D PRINTER AND 3D PRINTING METHOD

CROSS REFERENCE TO RELATED APPLICATION

This patent application claims the benefit and priority of Chinese Patent Application No. 202111287934.4 filed on Nov. 2, 2021, the disclosure of which is incorporated by reference herein in its entirety as part of the present application.

TECHNICAL FIELD

The present disclosure relates to the technical field of 3D printers, in particular to a sunken 3D printer and a 3D printing method.

BACKGROUND ART

The resin tank of traditional light-curing 3D printer comprises resin tank frame, glass board, release film and spaced film. The resin tank contains light-curing resin, and the optical machine is arranged below the resin tank, and print platform is arranged above the resin tank. When 3D printing is carried out, the printing platform is descended to the bottom of the resin tank containing the light-cured resin, the cross-sectional diagram of the three-dimensional model projected by the optical machine sequentially penetrates through the glass plate, the spacer film and the release film, and finally the cross-sectional diagram is irradiated on the resin in the gap between the release film and the printing platform, so that the resin in the gap between the release film and the printing platform is subjected to curing reaction and is cured into the shape of a projected image, and the thickness of the curing resin layer is the height of the gap between the printing platform and the release film. And then the printing platform starts to be pulled upwards, because the printing platform is of a rigid structure and fine sand grains are attached to the printing platform, the adhesive force between the cured resin layer and the printing platform is greater than the adhesive force between the cured resin layer and the release film, and when the printing platform is pulled upwards, the cured resin layer is attached to the printing platform and is peeled from the release film. When printing the second layer, print platform descends to the resin tank again, and leaves certain gap from the release film in with the resin tank, repeat the above-mentioned operation in circulation until the model is printed completed.

For a traditional light-curing 3D printer, the release film is an elastic transparent film, and the elasticity is reduced after repeated use, so that the release film becomes loose and the printing precision is influenced; when small particles are introduced into the resin tank or a small printing model is left in the resin tank, the release film or the glass plate is damaged due to continuous printing, so that resin liquid in the tank flows out to the lens of the optical machine, and the lens is permanently damaged; the existence of the glass plate, the spacer film and the release film causes the light to be refracted for six times when reaching the resin curing surface, so that the printing precision is seriously reduced; and under the influence of release power, the adhesion force between the cured layer resin and print platform can be smaller and smaller, and the model that has not printed probably drops from print platform.

SUMMARY

The present disclosure aims to provide a sunken 3D printer and a 3D printing method, and aims to solve the problems that a model falls off a plate, the printing precision is low, and printing consumables need to be replaced regularly.

In order to achieve the purpose, the present disclosure adopts the following technical solution:

In a first aspect, a sunken 3D printer is provided, comprising:
a main table top comprising a horizontal table top and a vertical table top which are perpendicular to each other, and the horizontal table top is provided with a resin tank;
a first linear driving mechanism mounted at one end, close to the horizontal table top, of the vertical table top, and a first output end of the first linear driving mechanism is able to move upwards or downwards along a vertical direction;
a second linear driving mechanism mounted at the other end, far away from the horizontal table top, of the vertical table top, and a second output end of the second linear driving mechanism is able to move upwards or downwards along the vertical direction;
a printing platform fixedly connected with the first output end and moves upwards or downwards along with the first output end;
an optical machine scraper assembly located above the printing platform, wherein the optical machine scraper assembly comprises:
an optical machine mechanism comprising an optical machine and an optical machine mounting seat which are fixedly connected to each other, and the optical machine mounting seat is fixedly connected with the second output end and moves upwards or downwards along with the second output end;
a scraper mechanism comprising a scraper motor, a scraper shaft and a scraper, the scraper motor is fixedly connected with the optical machine mounting seat, one end of the scraper shaft is fixedly connected with the output end of the optical machine mounting seat, another end of the scraper shaft is fixedly connected with the scraper, a distance measuring sensor is provided on the scraper, and the scraper motor is able to drive the scraper to make a fan-shaped movement.

Optionally, the first linear drive mechanism comprises:
two first screw mounting seat provided on the vertical table top at an interval along a same vertical direction;
a first driving screw, two ends of the first driving screw are rotatably connected with the two first screw mounting seats;
a first driving motor, an output end of the first driving motor is fixedly connected with the first driving screw;
a first driving sliding block in threaded connection with the first driving screw, and when the first driving motor is activated, the first driving sliding block serves as a first output end of the first linear driving mechanism and drives the printing platform to move upwards or downwards along the vertical direction.

Optionally, the printing platform comprises platform brackets and a platform supporting plate, the first linear driving mechanism is mounted on a back of the vertical table top, two strip-shaped through holes are formed in the vertical table top, two platform brackets are provided and correspond to the two strip-shaped through holes respectively; one end of each of the platform brackets is fixedly connected with the platform supporting plate, and another end of each of the platform brackets passes through a corresponding one of the strip-shaped through holes and is fixedly connected with the first driving sliding block.

Optionally, the printing platform further comprises a platform bracket connecting block, and two ends of the platform bracket connecting block are fixedly connected with the two platform brackets.

Optionally, a linear bearing is provided on the platform bracket connection block, and the scraper shaft passes through the linear bearing.

Optionally, the second linear drive mechanism comprises:
- two second screw mounting seats arranged on the vertical table top at an interval along a same vertical direction;
- a second driving screw, two ends of the second driving screw are rotatably connected with the two second screw mounting seats;
- a second driving motor, an output end of the second driving motor is fixedly connected with the second driving screw;
- a second driving sliding block in threaded connection with the second driving screw, and when the second driving motor is activated, the second driving sliding block serves as a second output end of the second linear driving mechanism and is able to drive the optical machine mechanism and the scraper mechanism to move upwards or downwards along the vertical direction.

Optionally, the second linear driving mechanism further comprises two linear guide rails provided on the vertical table top at an interval, and the second driving sliding block is slidably connected with the two linear guide rails.

Optionally, the distance measuring sensor is a laser distance measuring meter.

In a second aspect, a 3D printing method is provided, where the above sunken 3D printer is used, and the method comprises the following steps:
- step S1: adding resin liquid into the resin tank, activating the second linear driving mechanism, and moving the scraper to a specified distance Y above the liquid level of the resin liquid;
- step S2: setting the thickness of a printing layer as a, activating a first linear driving mechanism, and descending the printing platform by a specified distance X and then ascending by a specified distance X-a after being immersed in resin liquid;
- step S3: after the printing platform is stabilized, activating a scraper motor, and the scraper rotates to scrape off the excess resin liquid exceeding the printing layer thickness a on the printing platform;
- step S4: activating the optical machine, curing the resin liquid with the layer thickness a remained on the printing platform, and carrying out a curing reaction on the resin liquid to obtain a cured resin layer;
- step S5: after the curing of the cured resin layer is completed, the printing platform moves downwards for a specified distance X and then rises for a specified distance X-a after being immersed in the resin liquid, the scraper motor is activated again, and the scraper scrapes off the excess resin liquid exceeding the layer thickness a on the cured resin layer to prepare for next-layer printing;
- and step S6, repeating the step S4 and the step S5 until the 3D model printing is completed.

Optionally, in step S1, measuring a distance between the scraper and a liquid level of the resin liquid in the resin tank in real time by the distance measuring sensor, and when the distance measuring sensor measures the distance between the scraper and the liquid level of the resin liquid as the specified distance Y, the scraper stops moving.

The present disclosure has the beneficial effects as follows:

The sunken-type 3D printer of the present disclosure, printing consumables such as the release film and the spacing film do not need to be used in the resin tank, and a printing light path does not pass through the release film, the spacing film and the glass of the resin tank, so that the influence of refraction on the precision is avoided, and the printing precision of the model is improved. The printed model is cured and formed above the print platform, the phenomenon of plate falling does not exist, compared to the traditional pull-up 3D printer, the sunken 3D printer of the present disclosure can print bigger, heavier 3D model.

The 3D printing method of the present disclosure used the above sunken 3D printer, the printing precision is high, the efficiency is high, the printing thickness of each layer of the model is accurately controlled, there is no need to replace printing consumables such as release film and spacer film during the printing process and the printing cost is low.

In these figures:
1. main table top; 11. horizontal table top; 111. resin tank; 12. vertical table top; 121. strip-shaped through hole;
2. first linear drive mechanism; 21. first screw mounting seat; 22. first drive screw; 23. first drive motor; 24. first drive sliding block;
3. second linear drive mechanism; 31. second screw mounting seat; 32. second drive screw; 33. second drive motor; 34. second driving sliding block; 35. linear guide rail;
4. printing platform; 41. platform bracket; 42. platform supporting plate; 43. platform bracket connecting block; 431. linear bearing;
5. optical machine scraper assembly; 51. optical machine mechanism; 511. optical machine; 512. optical machine mounting seat; 52. scraper mechanism; 521. scraper motor; 522. scraper shaft; 523. scraper; 5231. distance measuring sensor.

DETAILED DESCRIPTION OF THE EMBODIMENTS

Reference will now be made in detail to the embodiments of the present disclosure, examples of which are illustrated in the accompanying drawings, wherein like reference numerals refer to the same or similar parts throughout, or parts having the same or similar functions. The embodiments described below with reference to the accompanying drawings are illustrative and intended to explain the present disclosure and should not be construed as limiting the present disclosure.

In the description of the present disclosure, unless otherwise specifically stated or limited, the terms "connected with", "connected to" and "fixed" are to be construed broadly and may include, for example, fixed or detachable connections, mechanical or electrical connections, direct or indirect connections via intermediate media, communication between two elements, or the interaction between two elements. The specific meanings of the above terms in the present disclosure can be understood according to specific situations by those of ordinary skill in the art.

In the description of the present disclosure, unless otherwise explicitly specified or limited, the first feature "above" or "under" the second feature may include the first feature and the second feature being in direct contact, and may also include the first feature and the second feature not being in direct contact but being in contact via another feature therebetween. Also, the first feature "on," "above" and "over" the second feature may include the first feature being directly above and obliquely above the second feature, or simply indicating that the first feature is at a higher level than the second feature. the first feature "beneath," "under" and "below" a second feature includes the first feature being directly beneath and obliquely beneath the second feature, or simply indicating that the first feature is at a lesser elevation than the second feature.

In the description of the present embodiment, the terms "upper", "lower", "right", etc. are used based on the orientations or positional relationships shown in the drawings for convenience of description and simplicity of operation, but do not indicate or imply that the device or element referred to must have a specific orientation, be constructed and operated in a specific orientation, and thus, should not be construed as limiting the present disclosure. Furthermore, the terms "first" and "second" are used only for descriptive purposes and are not intended to be limiting.

The technical solutions of the present disclosure are further explained by the specific implementation mode in combination with the attached drawings.

Figure 1:
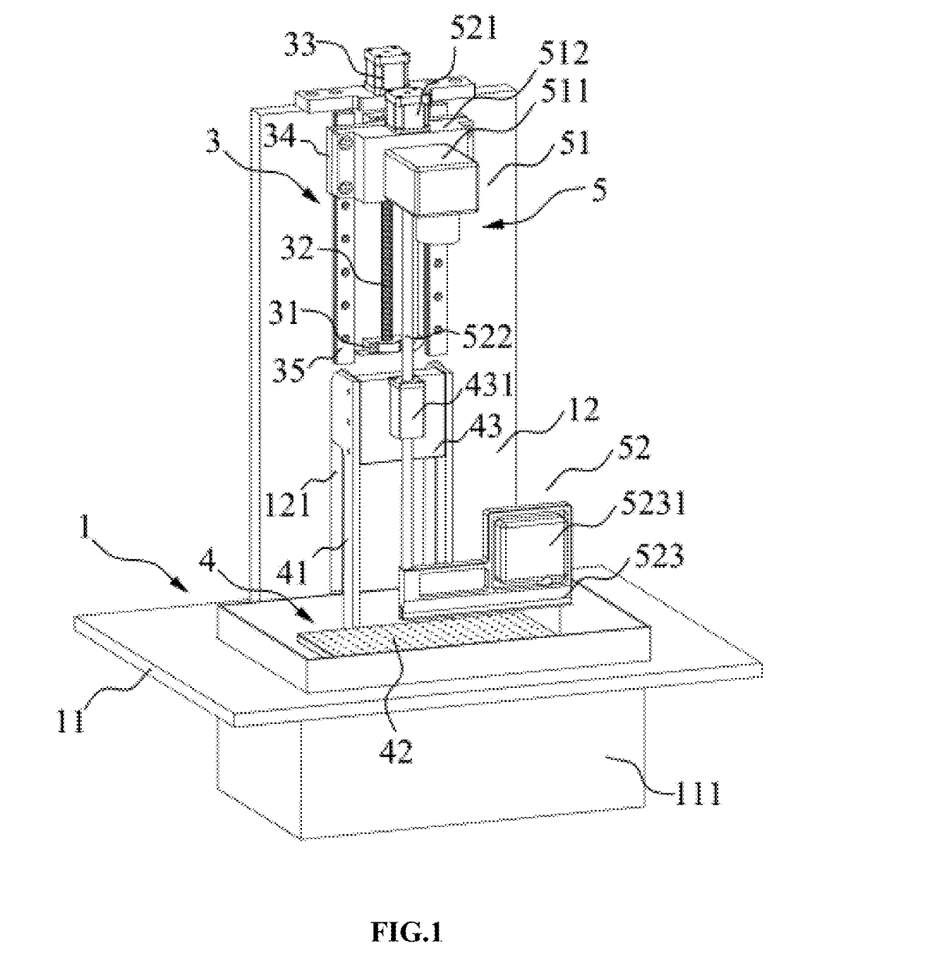
FIG. 1 is a schematic front structural diagram of a sunken 3D printer according to an embodiment of the present disclosure.
Figure 2:
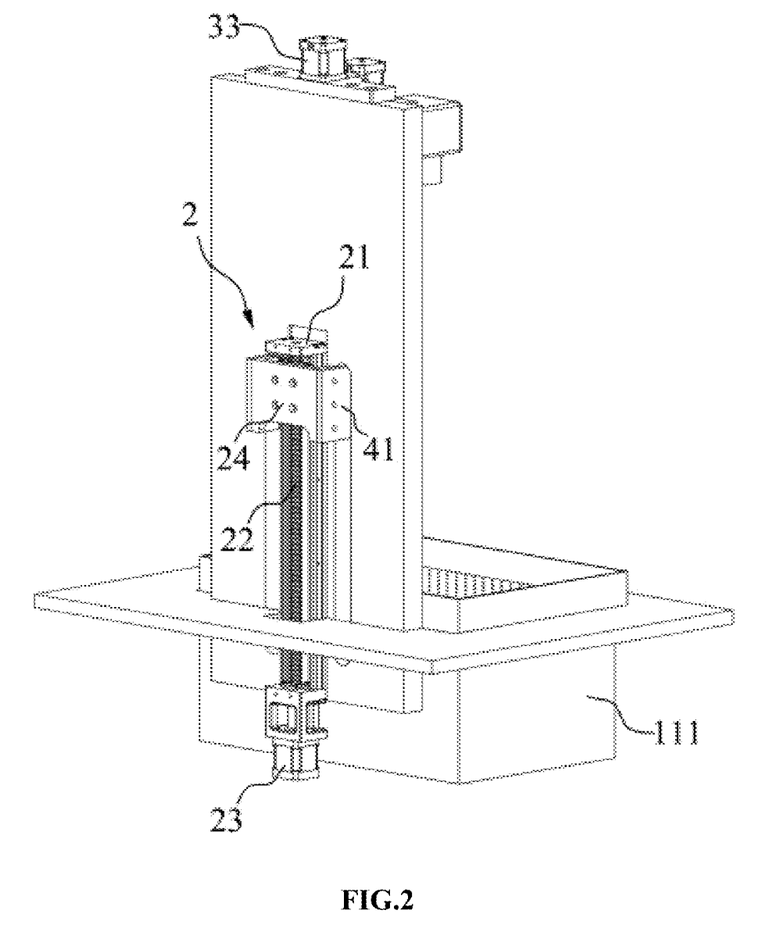
FIG. 2 is a schematic diagram of a back structure of the sunken 3D printer according to the embodiment of the present disclosure.

As shown in FIGS. 1-2, the present disclosure provides a sunken 3D printer, which comprises a main table top 1, a first linear driving mechanism 2, a second linear driving mechanism 3, a printing platform 4 and an optical machine scraper assembly 5. The main table top 1 includes a horizontal table top 11 and a vertical table top 12 which are perpendicular to each other, and the horizontal table top 11 and vertical table top 12 are fixedly connected, a resin tank 111 is provided in the horizontal table top 11, and resin tank 111 is used for containing the resin liquid. The first linear driving mechanism 2 is installed at one end, close to the horizontal table top 11, of the vertical table top 12, a first output end of the first linear driving mechanism 2 can move upwards or downwards along the vertical direction, and the printing platform 4 is fixedly connected with the first output end and moves upwards or downwards along with the first output end. The second linear driving mechanism 3 is installed at the other end, far away from the horizontal table top 11, of the vertical table top 12, and the second output end of the second linear driving mechanism 3 can move upwards or downwards along the vertical direction. The optical machine scraper assembly 5 is placed above the printing platform 4, the optical machine scraper assembly 5 comprises an optical machine mechanism 51 and a scraper mechanism 52. The optical machine mechanism 51 comprises an optical machine 511 and an optical machine mounting seat 512 which are fixedly connected, and the optical machine mounting seat 512 is fixedly connected with the second output end and moves upwards or downwards along with the second output end. The scraper mechanism 52 includes a scraper motor 521, scraper shaft 522 and scraper 523, scraper motor 521 is fixedly connected with the optical machine mount seat 512, one end of scraper shaft 522 is fixedly connected with the output end of the scraper motor 521, the other end of the scraper shaft 522 is fixedly connected with the scraper 523, the scraper 523 is provided with a distance measuring sensor 5231, and scraper motor 521 can drive the scraper 523 to make a fan-shaped movement.

When printing, the resin liquid is injected into the resin tank 111, the distance measuring sensor 5231 measures the distance between the distance measuring sensor 5231 and the liquid level of the resin liquid, the second linear driving mechanism 3 drives the optical machine scraper assembly 5 to integrally move upwards or downwards, the scraper 523 is moved to a specified distance Y above the liquid level of the resin liquid, then the first linear driving mechanism 2 is activated, the printing platform 4 is firstly lowered by the specified distance X, the printing platform 4 is immersed in the resin liquid, the printing platform 4 is then raised by the specified distance X-a, a large amount of resin liquid is stored on the printing platform 4 at the moment, the scraper motor 521 is activated to drive the scraper 523 to rotate over a fan shape area, namely the scraper 523 rotates 180 degrees around the scraper shaft 522, the excess resin liquid exceeding the thickness a on the printing platform 4 is scraped, and only the resin liquid with the thickness a is kept on the printing platform 4; then, the optical machine 511 is activated, the cross-sectional view of the printing model is projected onto the printing platform 4, so that the resin liquid on the printing platform 4 is subjected to a curing reaction, the printing of the layer is finished, when the second layer of printing is performed, the printing platform 4 descends again by the specified distance X, the resin liquid is made to sink over the curing molding surface on the printing platform 4, then the printing platform 4 is moved upwards by the specified distance X-a, the distance between the curing molding surface at the topmost layer of the printing platform 4 and the scraper 523 is a, the scraper 523 rotates to scrape off the excess resin liquid exceeding the layer thickness a on the curing molding surface, and the printing operation is repeated until all the 3D models are printed.

Optionally, the first linear drive mechanism 2 comprises a first screw mounting seat 21, a first drive screw 22, a first drive motor 23 and a first drive sliding block 24. Two first screw mounting seats 21 are arranged on the vertical table top 12 at an interval along the same vertical direction; two ends of the first driving screw 22 are rotatably connected with the two first screw mounting seats 21; the output end of the first driving motor 23 is fixedly connected with the first driving screw 22; the first driving sliding block 24 is in threaded connection with the first driving screw 22, and when the first driving motor 23 is activated, the first driving sliding block 23 serves as a first output end of the first linear driving mechanism 2 and can drive the printing platform 4 to move upwards or downwards along the vertical direction.

Optionally, the second linear driving mechanism 3 includes a second screw mounting seat 31, a second driving screw 32, a second driving motor 33 and a second driving sliding block 34. Two second screw mounting seats 31 are arranged on the vertical table top 12 at an interval along the same vertical direction; two ends of the second driving screw 32 are rotatably connected with the two second screw mounting seats 31; the output end of the second drive motor 33 is fixedly connected with the second drive screw 32; the second driving sliding block 34 is in threaded connection with the second driving screw 32, and when the second driving motor 33 is activated, the second driving sliding block 34 serves as a second output end of the second linear driving mechanism 3, and can drive the optical mechanical mechanism 51 and the scraper mechanism 52 to move upwards or downwards along the vertical direction.

As shown in FIG. 1 and FIG. 2, in this embodiment, the first linear driving mechanism 2 and the second linear driving mechanism 3 have the same structure and are both linear modules, the first linear driving mechanism 2 is used for driving the printing platform 4 to move up and down, and the second linear driving mechanism 3 is used for driving the optical mechanical scraper assembly 5 to move up and down. The first linear driving mechanism 2 and the second linear driving mechanism 3 in the embodiment adopt a motor screw driving mode, and are good in transmission performance, strong in bearing capacity and high in displacement precision. Furthermore, the first linear driving mechanism 2 and the second linear driving mechanism 3 may be linear modules of other driving types, or may be hydraulically driven, and the present embodiment is not limited thereto.

Optionally, the printing platform 4 includes platform brackets 41 and a platform supporting plate 42, the first linear driving mechanism 2 is installed on the back of the vertical table top 12, two strip-shaped through holes 121 are opened on the vertical table top 12, two platform brackets 41 are provided, and the two platform brackets 41 correspond to the two strip-shaped through holes 121 respectively; one end of each of the platform bracket 41 is fixedly connected with the platform supporting plate 42, and the other end of the each of the platform bracket 41 passes through the corresponding one of the strip-shaped through holes 121 to be fixedly connected with the first driving sliding block 24. As shown in FIG. 1, the first linear driving mechanism 2 in this embodiment is installed on the back of the vertical table top 12, one end of one of the platform brackets 41 is fixedly connected to the platform supporting plate 42, and the other end of the one of the platform bracket 41 passes through the corresponding strip-shaped through hole 121 to be fixedly connected to the first driving sliding block 24, so as to drive the platform bracket 41 and the platform supporting plate 42 to move up and down synchronously when the first driving sliding block 24 moves up and down.

Optionally, the printing platform 4 further includes a platform bracket connection block 43, and two ends of the platform bracket connection block 43 are fixedly connected to the two platform brackets 41. As shown in FIG. 1, the platform bracket connecting block 43 is fixedly connected between the two platform brackets 41, so that the stability between the two platform brackets 41 is enhanced, and the structural strength is ensured.

Alternatively, a linear bearing 431 is provided on the platform bracket connection block 43, and the scraper shaft 522 is passed through the linear bearing 431. In this embodiment, the linear bearing 431 is disposed on the platform bracket connection block 43, the linear bearing 431 is a component commonly used in the art, and the scraper shaft 522 passes through the linear bearing 431, so that the coaxiality of the scraper shaft 522 is ensured, and the scraper shaft 522 is prevented from being deviated.

Optionally, the second linear driving mechanism 3 further includes two linear guide rails 35, two linear guide rails 35 are provided on the vertical table top 12 at an interval, and the second driving sliding block 34 is slidably connected to the two linear guide rails 35, so as to ensure the stability of movement of the second driving sliding block 34.

Optionally, the distance measuring sensor 5231 in this embodiment is a laser distance measuring instrument, which is a common instrument in the art, and other distance measuring instruments may also be used, which is not limited to this embodiment.

The embodiment also provides a 3D printing method, using the above-mentioned sunken 3D printer, comprises the following steps:

step S1: adding resin liquid into the resin tank 111, activating the second linear driving mechanism 3, and moving the scraper 523 to a specified distance Y above the liquid level of the resin liquid;

in this step, the distance measuring sensor 5231 measures the distance between the scraper 523 and the liquid level of the resin liquid in the resin tank 111 in real time, and when the distance measuring sensor 5231 measures the distance between the scraper 523 and the liquid level of the resin liquid as the specified distance Y, the scraper 523 stops moving. It should be noted that, during the printing process, the distance between the scraper 523 and the resin liquid is always the designated distance Y, and as the resin liquid is consumed during the printing process, the liquid level of the resin liquid is lowered, and the scraper 523 also moves downward.

Step S2: setting the thickness of a printing layer as a, activating the first linear driving mechanism 2, and descending the printing platform 4 by a specified distance X and then ascending by a specified distance X-a after being immersed in resin liquid;

in this step, the printing platform 4 is lowered by a specified distance X to immerse the printing platform 4 in the resin liquid, and then the printing platform 4 is raised by a specified distance X-a, so that the layer thickness a is the thickness of the resin solution during each 3D printing, and is set according to the printing requirements.

Step S3: after the printing platform 4 is stabilized, the scraper motor 521 is activated, and the scraper 523 rotates to scrape off the excess resin liquid exceeding the printing layer thickness a on the printing platform 4;

in this step, after the printing platform 4 is stabilized, the scraper motor 521 activates to drive the scraper 523 to work, so as to scrape off the excess resin liquid above the printing platform 4, which exceeds the printing layer thickness a, so that only the resin liquid with the layer thickness a remains on the printing platform 4. Specifically, the scraper motor 521 drives the scraper 523 to rotate in a fan shape, the scraper 523 rotates 180 degrees around the scraper shaft 522, and excess resin liquid exceeding the printing layer thickness a on the printing platform 4 is scraped off, so that only the resin liquid with the layer thickness a is left on the printing platform 4.

Step S4: activating the optical machine 511, curing the resin liquid with the layer thickness a remained on the printing platform 4, and carrying out a curing reaction on the resin liquid to obtain a cured resin layer;

in this step, the optical machine 511 projects the cross-sectional view of the printing model onto the printing platform 4, so that the resin liquid on the printing platform 4 undergoes a curing reaction.

Step S5: after the curing of the cured resin layer is completed, the printing platform 4 continuously moves downwards for a specified distance X and then rises for a specified distance X-a after being immersed in the resin liquid, the scraper motor 521 is activated again, and the scraper 523 scrapes off the excess resin liquid exceeding the layer thickness a on the cured resin layer to prepare for next-layer printing;

in this step, after the resin layer on the printing platform 4 is cured, the printing platform 4 is moved downward by the specified distance X by the first linear driving mechanism 2, so that the cured resin layer on the printing platform 4 is immersed in the resin liquid, after the immersing, the printing platform 4 is raised by the specified distance X-a, the scraper 523 is activated to rotate to scrape off the excess resin liquid exceeding the layer thickness a on the cured resin layer, so that only the resin liquid with the layer thickness a is left on the cured resin layer of the printing platform 4, and the next 3D printing with the layer thickness a is prepared.

And step S6, repeating the step S4 and the step S5 until the 3D model printing is completed.

In this step, step S4 and step S5 are repeatedly performed until 3D model printing is completed, and the printing platform 4 is raised after the 3D model printing is completed. The printed 3D model is raised above the liquid level of the resin liquid and the 3D model is subsequently removed.

It should be understood that the above-described embodiments of the present disclosure are merely examples for clearly illustrating the present disclosure and are not intended to limit the embodiments of the present disclosure. Other variations and modifications will be apparent to persons skilled in the art in light of the above description. This need not be, nor should it be exhaustive of all embodiments. Any modification, equivalent replacement, and improvement made within the spirit and principle of the present disclosure should be included in the protection scope of the claims of the present disclosure.

What is claimed is:

1. A sunken 3D printer, comprising:
   a main table top (1) comprising a horizontal table top (11) and a vertical table top (12) which are perpendicular to each other, and the horizontal table top (11) is provided with a resin tank (111);
   a first linear driving mechanism (2) mounted at one end, close to the horizontal table top (11), of the vertical table top (12), and a first output end of the first linear driving mechanism (2) is able to move upwards or downwards along a vertical direction;
   a second linear driving mechanism (3) mounted at another end, far away from the horizontal table top (11), of the vertical table top (12), and a second output end of the second linear driving mechanism (3) is able to move upwards or downwards along the vertical direction;
   a printing platform (4) fixedly connected with the first output end and moves upwards or downwards along with the first output end;
   an optical machine scraper assembly (5) located above the printing platform (4), wherein the optical machine scraper assembly (5) comprises:
   an optical machine mechanism (51) comprising an optical machine (511) and an optical machine mounting seat (512) which are fixedly connected to each other, and the optical machine mounting seat (512) is fixedly connected with the second output end and moves upwards or downwards along with the second output end;
   a scraper mechanism (52) comprising a scraper motor (521), a scraper shaft (522) and a scraper (523), the scraper motor (521) is fixedly connected with the optical machine mounting seat (512), one end of the scraper shaft (522) is fixedly connected with the output end of the optical machine mounting seat (512), another end of the scraper shaft (522) is fixedly connected with the scraper (523), a distance measuring sensor (5231) is provided on the scraper (523), and the scraper motor (521) is able to drive the scraper (523) to make a fan-shaped movement.

2. The sunken 3D printer of claim 1, wherein the first linear drive mechanism (2) comprises:
   two first screw mounting seats (21) provided on the vertical table top (12) at an interval along a same vertical direction;
   a first driving screw (22), two ends of the first driving screw (22) are rotatably connected with the two first screw mounting seats (21);
   a first driving motor (23), an output end of the first driving motor (23) is fixedly connected with the first driving screw (22);
   a first driving sliding block (24) in threaded connection with the first driving screw (22), and when the first driving motor (23) is activated, the first driving sliding block (23) serves as a first output end of the first linear driving mechanism (2) and drives the printing platform (4) to move upwards or downwards along the vertical direction.

3. The sunken 3D printer according to claim 2, wherein the printing platform (4) comprises platform brackets (41) and a platform supporting plate (42), the first linear driving mechanism (2) is mounted on a back of the vertical table top (12), two strip-shaped through holes (121) are formed in the vertical table top (12), two platform brackets (41) are provided and correspond to the two strip-shaped through holes (121) respectively; one end of each of the platform brackets (41) is fixedly connected with the platform supporting plate (42), and another end of the each of the platform brackets passes through a corresponding one of the strip-shaped through holes (121) and is fixedly connected with the first driving sliding block (24).

4. The sunken 3D printer according to claim 3, wherein the printing platform (4) further comprises a platform bracket connecting block (43), and two ends of the platform bracket connecting block (43) are fixedly connected with the two platform brackets (41).

5. The sunken 3D printer according to claim 4, wherein a linear bearing (431) is provided on the platform bracket connection block (43), and the scraper shaft (522) passes through the linear bearing (431).

6. The sunken 3D printer defined in claim 1, wherein the second linear drive mechanism (3) comprises:
   two second screw mounting seats (31) arranged on the vertical table top (12) at an interval along a same vertical direction;
   a second driving screw (32), two ends of the second driving screw (32) are rotatably connected with the two second screw mounting seats (31);
   a second driving motor (33), an output end of the second driving motor (33) is fixedly connected with the second driving screw (32);
   a second driving sliding block (34) in threaded connection with the second driving screw (32), and when the second driving motor (33) is activated, the second driving sliding block (34) serves as a second output end of the second linear driving mechanism (3) and drives the optical machine mechanism (51) and the scraper mechanism (52) to move upwards or downwards along the vertical direction.

7. The sunken 3D printer according to claim 6, wherein the second linear driving mechanism (3) further comprises two linear guide rails (35) provided on the vertical table top (12) at an interval, and the second driving sliding block (34) is slidably connected with the two linear guide rails (35).

8. The sunken 3D printer according to claim 1, wherein the distance measuring sensor (5231) is a laser distance measuring meter.

9. A 3D printing method using a sunken 3D printer, the sunken 3D printer comprising:
- a main table top (1) comprising a horizontal table top (11) and a vertical table top (12) which are perpendicular to each other, and the horizontal table top (11) is provided with a resin tank (111);
- a first linear driving mechanism (2) mounted at one end, close to the horizontal table top (11), of the vertical table top (12), and a first output end of the first linear driving mechanism (2) is able to move upwards or downwards along a vertical direction;
- a second linear driving mechanism (3) mounted at another end, far away from the horizontal table top (11), of the vertical table top (12), and a second output end of the second linear driving mechanism (3) is able to move upwards or downwards along the vertical direction;
- a printing platform (4) fixedly connected with the first output end and moves upwards or downwards along with the first output end;
- an optical machine scraper assembly (5) located above the printing platform (4), wherein the optical machine scraper assembly (5) comprises:
- an optical machine mechanism (51) comprising an optical machine (511) and an optical machine mounting seat (512) which are fixedly connected to each other, and the optical machine mounting seat (512) is fixedly connected with the second output end and moves upwards or downwards along with the second output end;
- a scraper mechanism (52) comprising a scraper motor (521), a scraper shaft (522) and a scraper (523), the scraper motor (521) is fixedly connected with the optical machine mounting seat (512), one end of the scraper shaft (522) is fixedly connected with the output end of the optical machine mounting seat (512), another end of the scraper shaft (522) is fixedly connected with the scraper (523), a distance measuring sensor (5231) is provided on the scraper (523), and the scraper motor (521) is able to drive the scraper (523) to make a fan-shaped movement;
- wherein the 3D printing method using the sunken 3D printer comprising the steps of:
- step S1: adding resin liquid into the resin tank (111), activating the second linear driving mechanism (3), and moving the scraper (523) to a specified distance Y above the liquid level of the resin liquid;
- step S2: setting the thickness of a printing layer as a, activating a first linear driving mechanism (2), and descending the printing platform (4) by a specified distance X and then ascending by a specified distance X-a after being immersed in resin liquid;
- step S3: after the printing platform (4) is stabilized, activating a scraper motor (521), and the scraper (523) rotates to scrape off the excess resin liquid exceeding the printing layer thickness a on the printing platform (4);
- step S4: activating the optical machine (511), curing the resin liquid with the layer thickness a remained on the printing platform (4), and carrying out a curing reaction on the resin liquid to obtain a cured resin layer;
- step S5: after the curing of the cured resin layer is completed, the printing platform (4) moves downwards for a specified distance X and rises for a specified distance X-a after being immersed in the resin liquid, the scraper motor (521) is activated again, and the scraper (523) scrapes off the excess resin liquid exceeding the layer thickness a on the cured resin layer to prepare for next-layer printing; and
- step S6, repeating the step S4 and the step S5 until the 3D model printing is completed.

10. The 3D printing method according to claim 9, wherein in step S1, measuring a distance between the scraper (523) and a liquid level of the resin liquid in the resin tank (111) in real time by the distance measuring sensor (5231), and when the distance measuring sensor (5231) measures the distance between the scraper (523) and the liquid level of the resin liquid as the specified distance Y, the scraper (523) stops moving.

11. The sunken 3D printer according to claim 2, wherein the distance measuring sensor (5231) is a laser distance measuring meter.

12. The sunken 3D printer according to claim 3, wherein the distance measuring sensor (5231) is a laser distance measuring meter.

13. The sunken 3D printer according to claim 4, wherein the distance measuring sensor (5231) is a laser distance measuring meter.

14. The sunken 3D printer according to claim 5, wherein the distance measuring sensor (5231) is a laser distance measuring meter.

15. The sunken 3D printer according to claim 6, wherein the distance measuring sensor (5231) is a laser distance measuring meter.

16. The sunken 3D printer according to claim 7, wherein the distance measuring sensor (5231) is a laser distance measuring meter.

17. A 3D printing method using a sunken 3D printer, the sunken 3D printer comprising:
- a main table top (1) comprising a horizontal table top (11) and a vertical table top (12) which are perpendicular to each other, and the horizontal table top (11) is provided with a resin tank (111);
- a first linear driving mechanism (2) mounted at one end, close to the horizontal table top (11), of the vertical table top (12), and a first output end of the first linear driving mechanism (2) is able to move upwards or downwards along a vertical direction;
- a second linear driving mechanism (3) mounted at another end, far away from the horizontal table top (11), of the vertical table top (12), and a second output end of the second linear driving mechanism (3) is able to move upwards or downwards along the vertical direction;
- a printing platform (4) fixedly connected with the first output end and moves upwards or downwards along with the first output end;
- an optical machine scraper assembly (5) located above the printing platform (4), wherein the optical machine scraper assembly (5) comprises:
- an optical machine mechanism (51) comprising an optical machine (511) and an optical machine mounting seat (512) which are fixedly connected to each other, and the optical machine mounting seat (512) is fixedly connected with the second output end and moves upwards or downwards along with the second output end;
- a scraper mechanism (52) comprising a scraper motor (521), a scraper shaft (522) and a scraper (523), the scraper motor (521) is fixedly connected with the optical machine mounting seat (512), one end of the scraper shaft (522) is fixedly connected with the output end of the optical machine mounting seat (512), another end of the scraper shaft (522) is fixedly connected with the scraper (523), a distance measuring sensor (5231) is provided on the scraper (523), and the scraper motor (521) is able to drive the scraper (523) to make a fan-shaped movement;

the first linear drive mechanism (2) comprises:

two first screw mounting seats (21) provided on the vertical table top (12) at an interval along a same vertical direction;

a first driving screw (22), two ends of the first driving screw (22) are rotatably connected with the two first screw mounting seats (21);

a first driving motor (23), an output end of the first driving motor (23) is fixedly connected with the first driving screw (22);

a first driving sliding block (24) in threaded connection with the first driving screw (22), and when the first driving motor (23) is activated, the first driving sliding block (23) serves as a first output end of the first linear driving mechanism (2) and drives the printing platform (4) to move upwards or downwards along the vertical direction;

wherein the 3D printing method using the sunken 3D printer comprising the steps of:

step S1: adding resin liquid into the resin tank (111), activating the second linear driving mechanism (3), and moving the scraper (523) to a specified distance Y above the liquid level of the resin liquid;

step S2: setting the thickness of a printing layer as a, activating a first linear driving mechanism (2), and descending the printing platform (4) by a specified distance X and then ascending by a specified distance X-a after being immersed in resin liquid;

step S3: after the printing platform (4) is stabilized, activating a scraper motor (521), and the scraper (523) rotates to scrape off the excess resin liquid exceeding the printing layer thickness a on the printing platform (4);

step S4: activating the optical machine (511), curing the resin liquid with the layer thickness a remained on the printing platform (4), and carrying out a curing reaction on the resin liquid to obtain a cured resin layer;

step S5: after the curing of the cured resin layer is completed, the printing platform (4) moves downwards for a specified distance X and then rises for a specified distance X-a after being immersed in the resin liquid, the scraper motor (521) is activated again, and the scraper (523) scrapes off the excess resin liquid exceeding the layer thickness a on the cured resin layer to prepare for next-layer printing; and step S6, repeating the step S4 and the step S5 until the 3D model printing is completed.

18. The 3D printing method according to claim 17, wherein in step S1, measuring a distance between the scraper (523) and a liquid level of the resin liquid in the resin tank (111) in real time by the distance measuring sensor (5231), and when the distance measuring sensor (5231) measures the distance between the scraper (523) and the liquid level of the resin liquid as the specified distance Y, the scraper (523) stops moving.

19. A 3D printing method using a sunken 3D printer, the sunken 3D printer comprising:

a main table top (1) comprising a horizontal table top (11) and a vertical table top (12) which are perpendicular to each other, and the horizontal table top (11) is provided with a resin tank (111);

a first linear driving mechanism (2) mounted at one end, close to the horizontal table top (11), of the vertical table top (12), and a first output end of the first linear driving mechanism (2) is able to move upwards or downwards along a vertical direction;

a second linear driving mechanism (3) mounted at another end, far away from the horizontal table top (11), of the vertical table top (12), and a second output end of the second linear driving mechanism (3) is able to move upwards or downwards along the vertical direction;

a printing platform (4) fixedly connected with the first output end and moves upwards or downwards along with the first output end;

an optical machine scraper assembly (5) located above the printing platform (4), wherein the optical machine scraper assembly (5) comprises:

an optical machine mechanism (51) comprising an optical machine (511) and an optical machine mounting seat (512) which are fixedly connected to each other, and the optical machine mounting seat (512) is fixedly connected with the second output end and moves upwards or downwards along with the second output end;

a scraper mechanism (52) comprising a scraper motor (521), a scraper shaft (522) and a scraper (523), the scraper motor (521) is fixedly connected with the optical machine mounting seat (512), one end of the scraper shaft (522) is fixedly connected with the output end of the optical machine mounting seat (512), another end of the scraper shaft (522) is fixedly connected with the scraper (523), a distance measuring sensor (5231) is provided on the scraper (523), and the scraper motor (521) is able to drive the scraper (523) to make a fan-shaped movement;

the first linear drive mechanism (2) comprises:

two first screw mounting seats (21) provided on the vertical table top (12) at an interval along a same vertical direction;

a first driving screw (22), two ends of the first driving screw (22) are rotatably connected with the two first screw mounting seats (21);

a first driving motor (23), an output end of the first driving motor (23) is fixedly connected with the first driving screw (22);

a first driving sliding block (24) in threaded connection with the first driving screw (22), and when the first driving motor (23) is activated, the first driving sliding block (23) serves as a first output end of the first linear driving mechanism (2) and drives the printing platform (4) to move upwards or downwards along the vertical direction;

the printing platform (4) comprises platform brackets (41) and a platform supporting plate (42), the first linear driving mechanism (2) is mounted on a back of the vertical table top (12), two strip-shaped through holes (121) are formed in the vertical table top (12), two platform brackets (41) are provided and correspond to the two strip-shaped through holes (121) respectively;

one end of each of the platform brackets (41) is fixedly connected with the platform supporting plate (42), and another end of the each of the platform brackets passes through a corresponding one of the strip-shaped through holes (121) and is fixedly connected with the first driving sliding block (24);

wherein the 3D printing method using the sunken 3D printer comprising the steps of:

step S1: adding resin liquid into the resin tank (111), activating the second linear driving mechanism (3), and moving the scraper (523) to a specified distance Y above the liquid level of the resin liquid;

step S2: setting the thickness of a printing layer as a, activating a first linear driving mechanism (2), and descending the printing platform (4) by a specified distance X and then ascending by a specified distance X-a after being immersed in resin liquid;

step S3: after the printing platform (4) is stabilized, activating a scraper motor (521), and the scraper (523) rotates to scrape off the excess resin liquid exceeding the printing layer thickness a on the printing platform (4);

step S4: activating the optical machine (511), curing the resin liquid with the layer thickness a remained on the printing platform (4), and carrying out a curing reaction on the resin liquid to obtain a cured resin layer;

step S5: after the curing of the cured resin layer is completed, the printing platform (4) moves downwards for a specified distance X and then rises for a specified distance X-a after being immersed in the resin liquid, the scraper motor (521) is activated again, and the scraper (523) scrapes off the excess resin liquid exceeding the layer thickness a on the cured resin layer to prepare for next-layer printing; and step S6, repeating the step S4 and the step S5 until the 3D model printing is completed.

20. The 3D printing method according to claim 19, wherein in step S1, measuring a distance between the scraper (523) and a liquid level of the resin liquid in the resin tank (111) in real time by the distance measuring sensor (5231), and when the distance measuring sensor (5231) measures the distance between the scraper (523) and the liquid level of the resin liquid as the specified distance Y, the scraper (523) stops moving.

* * * * *